Figure 1:
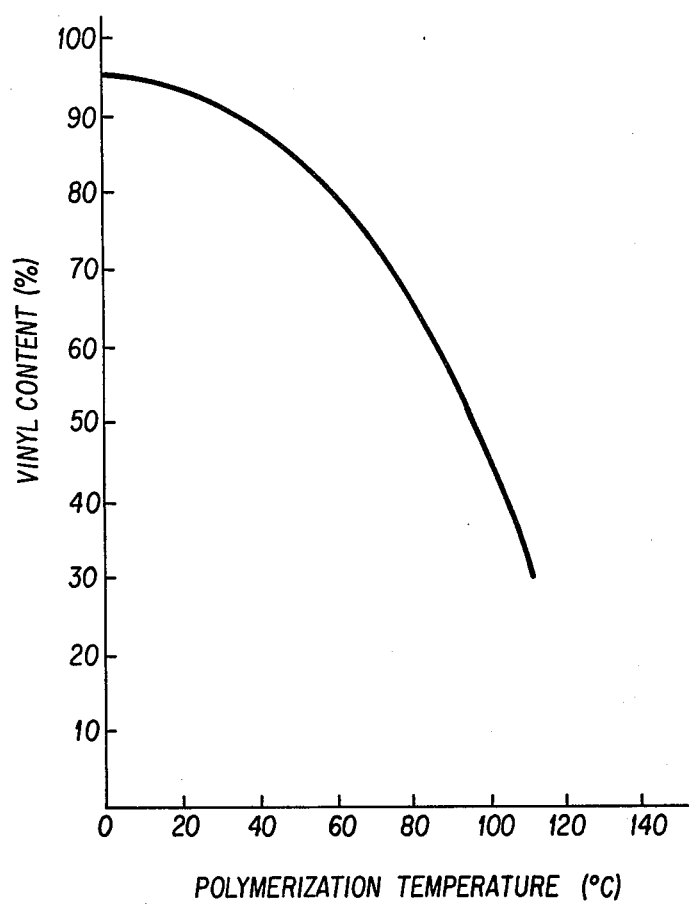

United States Patent [19]

Takeuchi et al.

[11] 4,433,109

[45] Feb. 21, 1984

[54] STYRENE-BUTADIENE BLOCK COPOLYMER

[75] Inventors: Yasumasa Takeuchi, Yokohama; Mitsuhiko Sakakibara, Yokkaichi; Fumio Tsutsumi, Yokkaichi; Akio Takashima, Yokkaichi; Iwakazu Hattori, Yokkaichi, all of Japan

[73] Assignee: Japan Synthetic Rubber Co., Ltd., Tokyo, Japan

[21] Appl. No.: 330,862

[22] Filed: Dec. 15, 1981

[30] Foreign Application Priority Data

Dec. 17, 1980 [JP] Japan .................... 55-178226
Dec. 26, 1980 [JP] Japan .................... 55-186194
Dec. 26, 1980 [JP] Japan .................... 55-186195

[51] Int. Cl.³ .......................................... C08F 297/04
[52] U.S. Cl. .......................................... 525/314
[58] Field of Search ................................ 525/314

[56] References Cited

U.S. PATENT DOCUMENTS

| 4,089,913 | 5/1978 | Miki | 525/314 |
|---|---|---|---|
| 4,091,051 | 5/1978 | Moczygemba | 525/314 |
| 4,107,236 | 8/1978 | Naylor | 525/314 |
| 4,248,982 | 2/1981 | Bi | 525/314 |

*Primary Examiner*—Paul R. Michl
*Attorney, Agent, or Firm*—Oblon, Fisher, Spivak, McClelland & Maier

[57] ABSTRACT

A styrene-butadiene block copolymer having a Mooney viscosity ($ML_{1+4}$, 100° C.) of 10 to 150 comprising two specific random styrene-butadiene copolymer blocks different in bound styrene content and in vinyl content in the butadiene portion, and optionally polybutadiene blocks, wherein the total vinyl content in the whole bound butadiene is 30 to 70% and the total bound styrene content is 10 to 40% by weight. Said block copolymer is excellent in wet skid resistance and rolling resistance, well-balanced in fracture and wear characteristics and also satisfactory in processability and cold flow property.

8 Claims, 2 Drawing Figures

STYRENE-BUTADIENE BLOCK COPOLYMER

This invention relates to a styrene-butadiene block copolymer comprising two styrene-butadiene copolymer blocks different from each other in styrene content and in vinyl content in the butadiene portion, and optionally polybutadiene blocks.

Recently, owing to the increasing request for low fuel consumption and high running safety of automobiles, there has become strongly desired a rubber material having low rolling resistance and high wet skid resistance when used as rubber for tyre tread rubber of automobile. However, said two characteristics are antagonistic to each other, and, in addition, it is hardly possible to satisfy these characteristics and wear characteristics at the same time by use of a single rubber material. Therefore, in order to harmonize these characteristics, use has been made of blends of dissimilar rubber materials. For instance, a blend of styrene-butadiene copolymer rubber containing 10 to 30% by weight of bound styrene and not more than 20% of vinyl configuration which has relatively high wet-skid resistance with a polybutadiene rubber containing not more than 20% of vinyl configuration which has low rolling resistance and high wear resistance has been used as the rubber for tyre tread of automobile. This blend, however, is unsatisfactory in other characteristics, particularly in wet skid resistance.

More lately, for improving such wet skid resistance and rolling resistance, attempts have been made to modify butadiene rubber (BR) or styrene-butadiene rubber (SBR) which is obtained by using mainly an organolithium compound as polymerization initiator. For instance, a rubber composition containing BR rich in vinyl configuration has recently been proposed as a commercial product that can match said object (British Pat. No. 1,166,832). BR rich in vinyl configuration is indeed advantageous for giving a good balance between wet skid resistance and rolling resistance, but it is excessively poor in fracture and wear characteristics, so that such BR can hardly be used alone. For improving such fracture and wear characteristics, blends with other diene rubbers such as natural rubber (NR), high-cis BR, emulsion-polymerized SBR and the like have been proposed. The blends with NR or high-cis BR, however, are inferior in balance between the wet skid resistance and the fracture and wear characteristics, while the blends with SBR are inferior in rolling resistance.

In Japanese Patent Application Kokai (Laid-Open) No. 62248/79, there has been tried an improvement of both wet skid resistance and rolling resistance by use of a random SBR having a bound styrene content of 20 to 40% by weight and a relatively high vinyl content in the butadiene portion. Such a random SBR is certainly improved in balance of wet skid resistance, rolling resistance, wear resistance, etc., as compared with the conventional emulsion-polymerized SBR or SBR obtained by using an organolithium polymerization initiator. However, when it is used alone it is still unsatisfactory in balance between wet skid resistance and rolling resistance or in fracture characteristics. Therefore, it must rely on blends with other diene rubbers. However, when blended with other diene rubbers, for example, a blend with high-cis BR is improved in rolling resistance but inferior in wet skid resistance and fracture characteristics, and a blend with NR is inferior in wet skid resistance. A blend with emulsion-polymerized SBR is inferior in rolling resistance. Thus, in these blends, the individual features of the respective blend constituents are not fully utilized.

On the other hand, Japanese Patent Publication No. 37415/74 proposes an A-B type block BR comprising blocks different in vinyl content and an A-B type block SBR comprising blocks different in bound styrene content and in vinyl content in the butadiene portion for the improvement of wet skid resistance. However, said block BR is comparatively balanced in wet skid resistance and rolling resistance, but is remarkably inferior in fracture characteristics and is difficult to use alone.

Said block SBR is relatively well balanced in wet skid resistance, rolling resistance, wear resistance, and processability, as compared with conventional SBR obtained with organolithium initiators, but such an improvement is still unsatisfactory in view of high performance required in the tyre industry. Thus, the use of said block SBR alone for commercial purposes is difficult.

On the basis of these prior art proposals, the present inventors have made efforts for further improving the wet skid resistance and rolling resistance of SBR using an organolithium polymerization initiator, and have found that a styrene-butadiene block copolymer having a Mooney viscosity ($ML_{1+4}$, 100° C.) of 10 to 150 and comprising two styrene-butadiene random copolymer blocks different in average vinyl content in the butadiene portion and in bound styrene content, and optionally polybutadiene blocks, wherein the total vinyl content in the whole bound butadiene is 30 to 70% and the total bound styrene content is 10 to 40% by weight, is excellent in both wet skid resistance and rolling resistance, well balanced in fracture and wear characteristics and also satisfactory in processability and cold flow property.

According to this invention, there is provided a styrene-butadiene block copolymer (I) consisting essentially of (A) at least one styrene-butadiene random copolymer block having a bound styrene content of 10 to 50% by weight and a vinyl content of 25 to 50% in the butadiene portion and (B) at least one styrene-butadiene random copolymer block having a bound styrene content of 1 to 30% by weight and a vinyl content of at least 60% in the butadiene portion, wherein the fraction of said copolymer block (A) is 10 to 90% by weight, the total vinyl content in the whole bound butadiene is 30 to 70%, and the total bound styrene content is 10 to 40% by weight; a styrene-butadiene block copolymer (II) consisting essentially of (A') at least one styrene-butadiene random copolymer block having a bound styrene content of 20 to 50% by weight and a vinyl content of 40 to 75% in the butadiene portion and (B') at least one polymer block having a bound styrene content of not more than 10% by weight and a vinyl content of more than 20% but not more than 50% in the butadiene portion, wherein the total vinyl content in the whole bound butadiene is 30 to 70%, the total bound styrene content is 10 to 40% and the fraction of said copolymer block (A') is 10 to 90% by weight; or a styrene-butadiene block copolymer (III) consisting essentially of (A") at least one styrene-butadiene random copolymer block having a bound styrene content of 10 to 50% by weight and a vinyl content of 10 to 50% in the butadiene portion, (B") at least one styrene-butadiene random copolymer block having a bound styrene content of 1 to 30% by weight and a vinyl content of at least 60% in the butadiene portion, and (C) at least one polybutadiene back having a vinyl content of 10 to 50%, wherein each of the blocks (A″), (B″) and (C) is contained in a proportion of at least 10% by weight, the total bound styrene content is 10 to 40% by weight and the total vinyl content in the whole bound butadiene is 30 to 70%.

The styrene-butadiene block copolymers obtained according to this invention are characterized by the excellent wet skid resistance, rolling resistance, fracture resistance and wear resistance and the improved processability as compared with the conventional SBR.

The excellent physical properties of the styrene-butadiene block copolymers of this invention result from the specific phenomenon that the two or three different blocks (A)-(B), (A′)-(B′) or (A″)-(B″)-(C) having the different characteristics and different solubility parameters are surprisingly rendered compatible through the vulcanization step.

The block copolymers according to this invention, when in a state of raw rubber, show different glass transition points corresponding to the respective blocks, but when vulcanized, they show a single glass transition point and also the temperature-tan δ distribution curve drawn up by a dynamic measuring method has a single peak and is very broad. It should be noted that the compositions formed by simply blending said respective blocks (A), (B), etc., are not rendered compatible to such a degree as to give a single glass transition point, so that such compositions are poor particularly in fracture characteristics and it is impossible to develop the physical properties of the above block copolymers.

The vinyl content in the respective blocks of the block copolymer (I) according to this invention is 25 to 50%, preferably 25 to 45% in the case of block (A) and at least 60%, preferably at least 70% in the case of block (B), and it is preferable that at least one of said blocks has a vinyl content distribution breadth of at least 20%. By allowing the blocks to have a vinyl content distribution breadth, the fracture characteristics are improved and the balance between wet skid resistance and rolling resistance becomes good as compared with the block copolymers having no such distribution breadth.

The term "vinyl content distribution breadth" is used herein to signify a change of vinyl content along one molecular chain. For example, when styrene and butadiene are copolymerized with a catalyst consisting of a combination of an organolithium compound and a Lewis base (such as an ether or an amine) as shown in, for example, Japanese Patent Application Kokai (Laid-Open) No. 149,413/81, the vinyl content can be varied by providing a difference between the temperature at the time of initiation of polymerization and that at the time of completion thereof. It is to be noted that if the vinyl content in the copolymer block (A) exceeds 50%, both fracture characteristics and rolling resistance are deteriorated, while if said vinyl content is less than 25%, it becomes difficult to favorably balance the fracture characteristics, wet skid resistance and rolling resistance. Also, if the vinyl content in the copolymer block (B) is less than 60%, it is hard to balance the wet skid resistance and other characteristics.

The bound styrene content in the respective blocks in the block copolymer (I) according to this invention is within the range of 10 to 50% by weight, preferably 15 to 40% by weight, in the copolymer block (A) and 1 to 30% by weight, preferably 5 to 20% by weight, in the copolymer block (B). If the bound styrene content in the copolymer block (A) is less than 10% by weight, no satisfactory fracture characteristics are provided, while if said styrene content exceeds 50% by weight, the copolymer becomes inferior in rolling resistance. The same tendency as in the copolymer block (A) can be seen as to the bound styrene content in the copolymer block (B).

The weight ratio of the copolymer block (A) to the copolymer block (B) is within the range of 1:9 to 9:1. Even when the block copolymer (I) is composed of more than two blocks, such as (A)-(B)-(A) or (B)-(A)-(B), the excellent properties can be obtained if the total weight ratio of the copolymer block (A) to the copolymer block (B) defined above is satisfied.

The vinyl content in the respective blocks in the block copolymer (II) according to this invention is within the range of 40 to 75%, preferably 40 to 70%, in the copolymer block (A′) and more than 20% but not more than 50%, preferably 25 to 50%, in the polymer block (B′). When at least one of the blocks (A′) and (B′) has a vinyl content distribution breadth of at least 20% the fracture characteristics can be improved without impairing the balance of other characteristics. The term "vinyl content distribution breadth" used herein has the same meaning as defined in connection with the block copolymer (I).

If the vinyl content in the copolymer block (A′) is more than 75%, the fracture characteristics become inferior, and if said content is less than 40%, difficulties arise in providing a good balance between wet skid resistance and rolling resistance. Also, if the vinyl content in the polymer block (B′) is more than 50%, low rolling resistance results, and if said vinyl content is not more than 20%, no good balance is provided between wet skid resistance and rolling resistance.

The bound styrene content in the respective blocks in the block copolymer (II) according to this invention is required to be 20 to 50% by weight, preferably 20 to 40% by weight, in the copolymer block (A′) and not more than 10% by weight in the polymer block (B′). If the bound styrene content in the copolymer block (A′) is less than 20% by weight, neither satisfactory wet skid resistance nor satisfactory fracture characteristics are provided, and if said content exceeds 50% by weight, the rolling resistance is excessively deteriorated. Also, if the bound styrene content in the block (B′) exceeds 10% by weight, the block copolymer becomes unsatisfactory in rolling resistance.

The weight ratio of the copolymer block (A′) to the polymer block (B′) is within the range of 1:9 to 9:1, preferably 1:5 to 5:1. Even when the block copolymer (II) is composed of more than two blocks, such as (A′)-(B′)-(A′) or (B′)-(A′)-(B′), excellent properties can be obtained as far as the above-defined total weight ratio is satisfied.

The vinyl content in the respective blocks in the block copolymer (III) according to this invention is 10 to 50%, preferably 20 to 50% in the copolymer block (A″) and at least 60%, preferably at least 70%, in the copolymer block (B″), and 10 to 50%, preferably 20 to 40% in the polybutadiene block (C). Polymerization using an organolithium initiator can hardly give a block copolymer with a vinyl content of less than 10%. If the vinyl content in the copolymer block (A″) is more than 50%, there results an unsatisfactory rolling resistance, and if the vinyl content in the copolymer block (B″) is less than 60%, no good balance is provided between wet skid resistance and rolling resistance. If the vinyl content in the polymer block (C) is more than 50%, the fracture characteristics and wear characteristics become unsatisfactory.

The bound styrene content in the respective blocks in the block copolymers (III) according to this invention should be within the range of 10 to 50% by weight, preferably 20 to 40% by weight, in the copolymer block (A") and 1 to 30% by weight, preferably 5 to 20% by weight, in the copolymer block (B"). If the bound styrene content in the copolymer block (A") is less than 10% by weight, the resulting block copolymer is unsatisfactory in fracture characteristics, and if the bound styrene content is more than 50% by weight the rolling resistance becomes inferior. The same tendency is seen in the copolymer block (B").

Each of the polymer blocks is contained in an amount of at least 10% by weight in the block copolymer (III) according to this invention, and it is particularly desirable that the copolymer block (A") be contained in an amount of at least 40% by weight. A too low proportion of the copolymer block (A") results in poor fracture and wear characteristics, while a too low proportion of the polymer block (C) deteriorates the rolling resistance, and a too low proportion of the copolymer block (B") impairs the wet skid resistance.

In any of the block copolymers (I), (II) and (III) according to this invention, the total vinyl content in the whole bound butadiene should be 30 to 70%, and the total styrene content should be within the range of 10 to 40% by weight. If said contents are outside the above-defined ranges, it becomes impossible to secure a required balance among the fracture characteristics, the rolling resistance, the wear characteristics and the wet skid resistance.

For producing a styrene-butadiene block copolymer according to this invention, first the copolymer or polymer blocks (A), (A'), (A"), (B'), (B") or (C) are formed by polymerization and then the other copolymer blocks are formed by polymerization. The vinyl content in the copolymer blocks can be varied by changing the amount of the microstructure controlling agent or by changing the mean polymerization temperature without changing the amount of said microstructure controlling agent in the course of the polymerization of the respective copolymer blocks. Also, the bound styrene content can be changed by adjusting the styrene-butadiene monomer feed.

An organolithium compound may be used as polymerization initiator in the polymerization. Various types of ethers and amines may be used as controlling agent for vinyl content in the butadiene portion, and various types of ethers, amines and anionic surface active agents having a —$SO_3M$ or —$OSO_3M$ group (M representing Na, K, Rb or Cs) may be used as randomizing agent for styrene.

Examples of the organolithium compounds usable as polymerization initiator in this invention are methyllithium, ethyllithium, n-butyllithium, sec-butyllithium, tert-butyllithium, phenyllithium, tetramethylenedilithium, pentamethylenedilithium and decamethylenedilithium.

As the microstructure controlling agent, there may be used ether compounds and tertiary amines alone or in combination. Examples of such ether compounds and tertiary amines are diethyl ether or thioether, amyl ethyl ether, octyl ethyl ether, tetrahydrofuran, dioxane, ethylene glycol dimethyl ether, diethylene glycol dimethyl ether, triethylene glycol dimethyl ether, triethylamine, N,N,N',N'-tetramethylethylenediamine, triethylenediamine and N-methylmorpholine. These compounds can also serve as a styrene randomizing agent.

Beside said ethers and amines, there may be also used as randomizing agent an anionic surface active agent having an —$SO_3M$ or —$OSO_3M$ group (M representing Na, K, Rb or Cs). Examples of such surfactants are alkylarylsulfonates, amide-bonded sulfonates, ester-bonded sulfonates and ester-bonded sulfuric ester salts such as disclosed in Japanese Patent Publication No. 44315/79. Benzene, toluene, xylene, cyclohexane, hexane, heptane and the like may be used as polymerization solvent.

The polymerization temperature is important for deciding the vinyl content in the butadiene portion. In the polymerization using an organolithium compound and an ether or an amine, the vinyl content is influenced by the polymerization temperature, that is a low polymerization temperature leads to a high vinyl content and a high polymerization temperature leads to a low vinyl content. Usually the polymerization is carried out at a temperature within the range of 0° to 150° C. It is desirable to allow for a sufficient range of polymerization temperature for providing a required vinyl content distribution breadth in the blocks.

The styrene-butadiene block copolymers obtained according to this invention are markedly improved in wet skid resistance, rolling resistance, fracture and wear characteristics as well as in processability and cold flow characteristics as compared with the conventional SBR (obtained by using chiefly an organolithium compound as polymerization initiator), and thus, they can serve as a very excellent copolymer rubber.

By utilizing said characteristics, the block copolymers of this invention can be used, either alone or in blend with other rubbers, for the fabrication of tyres and other industrial products.

The present invention is described in further detail below referring to Examples and the accompanying drawings, but it is to be understood that this invention is by no way restricted to the Examples and the drawings.

Figure 2:
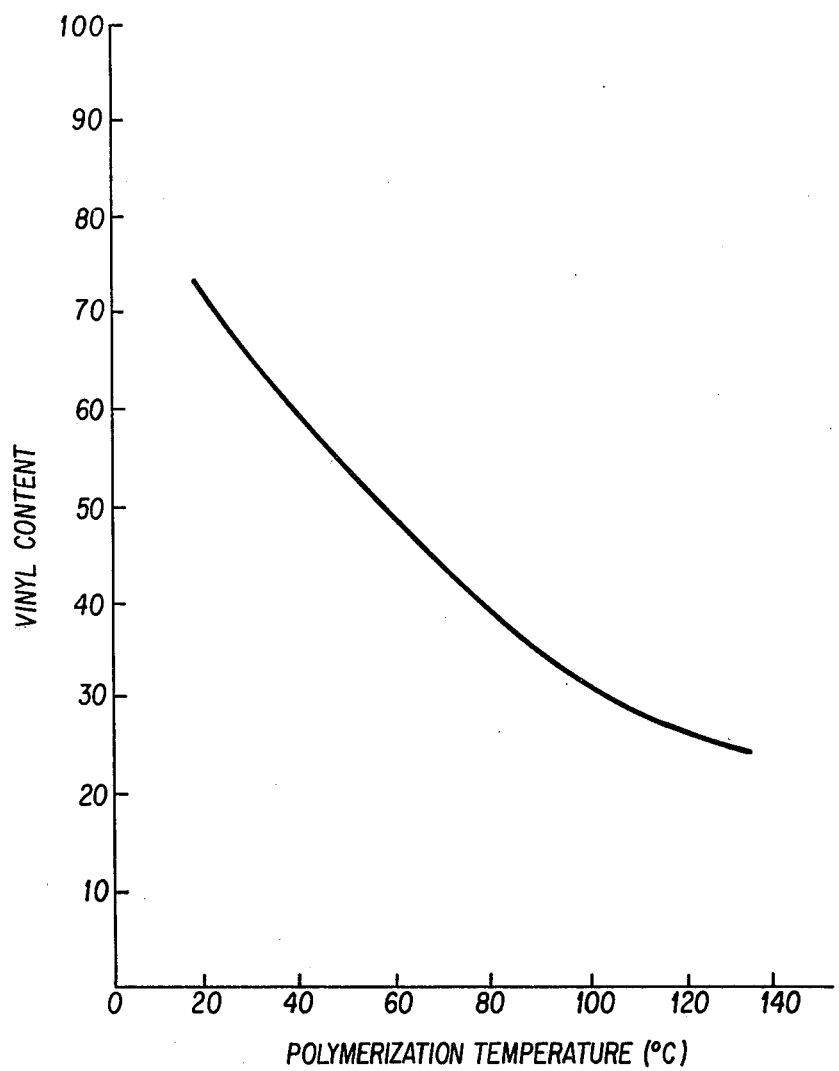

In the drawings,

FIG. 1 is a graph showing a relation between polymerization temperature and vinyl content in the polymerization of the copolymer blocks (B) in Example 1, and FIG. 2 is a graph showing a relation between polymerization temperature and microstructure in the polymerization of the copolymer blocks (A) in Example 11.

In the Examples, the wet skid resistance measured by a skid tester was adopted as an index of wet skid resistance of the products, and the impact resilience at 70° C. and heat-build-up temperature as measured by a Goodrich flexometer were used as an index of rolling resistance.

EXAMPLES 1-10 AND COMPARATIVE EXAMPLES 1-10

A 2-liter reactor were charged with 2,500 g of a cyclohexane/n-hexane (90/10 by weight) mixture and predetermined quantities of styrene, butadiene, tetrahydrofuran and potassium dodecylbenzenesulfonate in a nitrogen atmosphere and polymerized isothermally or adiabatically within the temperature range shown in the column of "Copolymer block (A) polymerization conditions" in Table 1 by using n-butyllithium as polymerization initiator. (Comparative Examples 8-10 are the random SBR's which were not subjected to polymerization of the copolymer blocks (B)). After the polymerization conversion had reached 95 to 100%, predetermined quantities of butadiene, styrene and diethylene glycol dimethyl ether were further supplied and the mixture was polymerized within the temperature range shown in the column of "Copolymer block (B) polymerization conditions" in Table 1. Upon completion of the polymerization, 2,6-di-tert-butyl-p-cresol was added in an amount of 0.7 part by weight to 100 parts by weight of the polymer. After removing the solvent by steam stripping, the residue was dried on 100° C. rolls to obtain a polymer. The properties of the thus obtained polymers are shown in Table 2. The microstructure of the butadiene portion in each polymer was determined according to D. Morero's method, and the styrene content in the copolymer was determined from the calibration curve using the absorbance at 699 cm$^{-1}$. FIG. 1 shows the relation between polymerization temperature and microstructure under the copolymer block (B) polymerization conditions in Example 1. In the adiabatic polymerization of the copolymer blocks (B) at a polymerization temperature within the range of 35°–80° C., the vinyl content distribution breadth became about 25%.

The obtained polymers were mixed and compounded by an internal mixer and rolls with the recipe shown in Table 3 and then vulcanized at 145° C. for 30 minutes.

The properties of the vulcanizates are shown in Table 4.

The styrene-butadiene block copolymer of Example 1 as higher in wet skid resistance, tensile strength, impact resilience and wear resistance than the random SBR of Comparative Example 8 which had almost the same vinyl contents and bound styrene contents as those of the copolymer of Example 1. The copolymer of Example 1 was also excellent in roll retention of compounded rubber. The copolymers of Examples 2–10 were also excellent in the above-said properties.

Comparative Examples 1, 3 and 5 were inferior to Example 1 in wet skid resistance; Comparative Examples 2, 4 and 6 were inferior in heat build-up and wear resistance; and Comparative Example 7 was inferior in impact resilience and heat build-up. Example 1 provided with said vinyl content distribution breadth was higher in tensile strength and wet skid resistance than Comparative Example 7 which had no vinyl content distribution breadth. Also, as appreciated from the results obtained from the Comparative Example 9/Comparative Example 10 (1/1) blend, the simple blends of copolymers cannot develop the excellent properties possessed by the block copolymers of this invention.

EXAMPLES 11–18 AND COMPARATIVE EXAMPLES 11–18

A 5-liter reactor was charged with 2,000 g of a cyclohexane/n-hexane (90/10 by weight) mixture and predetermined quantities of styrene, butadiene, tetrahydrofuran and potassium dodecylbenzenesulfonate in a nitrogen atmosphere and the mixture was subjected to isothermic or adiabatic polymerization under the polymerization conditions of the blocks (B') with a vinyl content as shown in Table 5 by using n-butyllithium as polymerization initiator. (In Comparative Examples 11 and 14, the polymerization was started with the block (A'), and in the others, the polymerization was started with the block (B'). Comparative Examples 16, 17 and 18 were random SBR's which were not subjected to the subsequent block polymerization.)

After the polymerization conversion had reached 95 to 100%, predetermined quantities of butadiene, styrene, tetrahydrofuran, diethylene glycol dimethyl ether and potassium dodecylbenzenesulfonate were supplied and the mixture was subjected to the remaining block (A') polymerization under the prescribed polymerization conditions. After completion of the polymerization, 2,6-di-tert-butyl-p-cresol was added in an amount of 0.7 part by weight to 100 parts by weight of the polymer, and after removing the solvent by steam stripping, the residue was dried on 100° C. rolls to obtain a polymer. The properties of the thus obtained polymers are shown in Table 6.

The microstructure in the butadiene portion in the polymer was observed according to D. Morero's method, and the styrene content in the copolymer was determined from the calibration curve using the absorbance at 699 cm$^{-1}$.

FIG. 2 shows the relation between polymerization temperature and microstructure under the polymerization conditions of the copolymer blocks (A') in Example 11.

In the adiabatic polymerization of the copolymer blocks (B') at a polymerization temperature within the range of 50° to 90° C., there was provided a vinyl content distribution breadth approximately 20%. The obtained polymers were mixed and compounded by an internal mixer and rolls according to the recipe shown in Table 3 and then vulcanized at 145° C. for 30 minutes. The properties of the resulting vulcanizates are shown in Table 7.

Comparative Example 17/Comparative Example 18 blend is a simple 50/50 blend of the copolymers of Comparative Examples 17 and 18.

It will be seen that the block copolymers of Examples 11–18 according to this invention are better in processability (roll retention) than the random SBR of Comparative Example 16 which has the same levels of vinyl content and bound styrene content as said examples of this invention. Example 11 is superior to Comparative Example 16 in wet skid resistance, wear characteristics and heat build-up. Example 13 is inferior to Example 11 in fracture characteristics because the former has no specific vinyl content distribution breacth.

Comparative Example 11 is relatively well-balanced among such factors as wet skid resistance, impact resilience and wear resistance, but their values are still unsatisfactory in comparison with those of Example 11. Comparative Examples 12–15 are inferior to Examples 11–18 in balance of said factors.

Simple blends of the blocks A and the blocks B of this invention are poor in processability, wet skid resistance, wear resistance, impact resilience and fracture characteristics.

EXAMPLES 19–25 AND COMPARATIVE EXAMPLES 19–27

A 5-liter reactor were charged with 2,500 g of a cyclohexane/n-hexane (90/10 by weight) mixture and predetermined quantities of a monomer and an ether in a nitrogen atmosphere and polymerized under the block (C) polymerization conditions shown in Table 8. After the polymerization conversion had reached 95–100%, predetermined amounts of monomer, ether and potassium dodecylbenzenesulfonate were further supplied and the mixture was polymerized under the block (A") polymerization conditions. After reaching a polymerization conversion of 95–100%, to the polymerization mixture were further added predetermined amounts of a monomer and an ether, and then polymerized under the block (B″) polymerization conditions. (The random SBR's of Comparative Examples 23–26 were polymerized with single feed of monomer and ether).

After completion of the polymerization, 2,6-di-tert-butyl-p-cresol was added in an amount of 0.7 part by weight to 100 parts by weight of the polymer, and after removing the solvent by steam stripping, the residue was dried on 100° C. rolls to obtain a polymer. The properties of the thus obtained polymers are shown in Table 9. The microstructure of the butadiene portion in the polymer was determined according to D. Morero's method, and the styrene content in the copolymer was determined from the calibration curve using the absorbance at 699 cm$^{-1}$.

The obtained polymers were mixed and compounded by an internal mixer and rolls with the recipe of Table 3 and vulcanized at 145° C. for 30 minutes. The properties of the vulcanizates are shown in Table 10.

The block SBR's of Examples 19–25 showed a better roll retention than the random SBR of Comparative Example 23 and were also excellent in wet skid resistance, impact resilience, Lambourn wear and tensile strength. Comparative Example 19 was inferior to Examples 19–25 in tensile strength and wet skid resistance, and Comparative Examples 20, 21 and 22 were low in impact resilience and high in heat build-up.

A simple blend of the respective blocks (Blend 1) was unable to develop the properties of the block copolymers of this invention. Also, blending of the (A″)-(C) or (A″)-(B″) block polymers with random SBR having the same amounts of bound styrene and vinyl configuration as (B″) or (C) were incapable of acquiring the properties possessed by the (A″)-(B″)-(C) type block polymers.

TABLE 1

|  | Copolymer block (A) polymerization conditions | | | | | Copolymer block (B) polymerization conditions | | | | |
| --- | --- | --- | --- | --- | --- | --- | --- | --- | --- | --- |
|  | Butadiene/ styrene (g) | n-BuLi*¹ (g) | Tetra-hydro-furan (g) | Potassium dodecyl-benzene-sulfonate (g) | Polymeri-zation tempera-ture (°C.) | Butadiene/ styrene (g) | Di-glyme*² (g) | Polymeriza-tion tempera-ture (°C) | (A)/(B) (wt. ratio) | Remarks |
| Example 1 | 188/62 | 0.35 | 2.0 | 0.1 | 35 | 225/25 | 220 | 35–80 | 1/1 |  |
| Example 2 | " | 0.31 | " | " | " | " | 0.60 | 35–80 | " |  |
| Example 3 | " | 0.36 | 5.0 | " | " | " | 2.25 | 35–80 | " |  |
| Example 4 | 163/87 | 0.38 | 2.5 | " | " | " | 2.30 | 35–80 | " |  |
| Example 5 | 188/62 | 0.34 | 2.0 | " | " | 237.5/12.5 | 2.15 | 35–80 | " |  |
| Example 6 | " | 0.31 | 2.0 | 0.1 | 20–50 | " | 1.91 | 50–90 | " |  |
| Example 7 | " | 0.33 | " | " | 35 | " | 0.50 | 35 | " |  |
| Example 8 | 250/83 | 0.35 | " | " | 20–60 | 150/17 | 4.30 | 60–75 | 2/1 |  |
| Example 9 | 94 322/108 | 0.38 | 1.8 | " | 10–60 | 64/7 | 2.30 | 60 | 6/1 |  |
| Example 10 | 125/42 | 0.30 | " | " | 30 | 300/33 | 0.61 | 30–85 | 1/2 |  |
| Comparative Example 1 | 225/25 | 0.29 | — | 0.16 | 50 | 225/25 | 0.60 | 50–90 | 1/1 |  |
| Comparative Example 2 | 188/62 | 0.32 | 2.0 | — | 35 | " | 0.63 | 35–80 | " |  |
| Comparative Example 3 | 237.5/12.5 | 0.31 | 1.5 | — | " | " | 2.10 | 35–80 | " |  |
| Comparative Example 4 | 100/150 | 0.37 | 5.0 | 0.1 | " | " | 2.28 | 35–80 | " |  |
| Comparative Example 5 | 188/62 | 0.35 | 2.0 | " | " | " | 0.30 | 35–80 | " |  |
| Comparative Example 6 | 200/50 | 0.37 | " | " | " | 150/100 | 2.25 | 35–80 | " |  |
| Comparative Example 7 | 213/37 | 0.28 | — | 0.15 | 50 | 200/50 | 0.61 | 55 | " |  |
| Comparative Example 8 | 410/90 | 0.28 | — | 0.1 | 50 | — | 0.29 | 50 | — | Random SBR |
| Comparative Example 9 | 450/40 | 0.25 | — | — | " | — | 0.60 | 50 | — | " |
| Comparative Example 10 | 375/125 | 0.27 | 2.0 | 0.1 | " | — | — | 50 | " |  |

Note:
Solvent: cyclohexane/n-hexane (90/10 by weight), 2,500 g.
*¹n-BuLi = n-butyllithium
*²Diglyme = diethylene glycol dimethyl ether

TABLE 2

|  | Block (A) | | | Block (B) | | | Whole polymer | | | |
| --- | --- | --- | --- | --- | --- | --- | --- | --- | --- | --- |
|  | Vinyl content in butadiene portion (%) | Bound styrene (%) | Presence or absence of vinyl content distribution breadth | Vinyl content in butadiene portion (%) | Bound styrene (%) | Presence or absence of vinyl content distribution breadth | Vinyl content in butadiene portion (%) | Bound styrene (%) | ML$_{1+4}^{100° C.}$ | (A)/(B) (wt. ratio) |
| Example 1 | 32 | 25 | Absent | 81 | 11 | Present | 58 | 18 | 49 | 1/1 |
| Example 2 | 31 | 26 | " | 74 | 10 | " | 54 | 18 | 51 | " |
| Example 3 | 41 | 25 | " | 82 | 10 | " | 63 | 17 | 53 | " |
| Example 4 | 30 | 35 | " | 81 | 11 | " | 61 | 23 | 48 | " |
| Example 5 | 31 | 25 | " | 80 | 5 | " | 59 | 15 | 49 | " |
| Example 6 | 31 | 27 | Present | 75 | 10 | " | 55 | 19 | 50 | " |
| Example 7 | 31 | 28 | Absent | 81 | 11 | Absent | 58 | 20 | 47 | " |
| Example 8 | 30 | 25 | Present | 80 | 11 | Present | 49 | 20 | 53 | 2/1 |

TABLE 2-continued

| | Block (A) | | | Block (B) | | | Whole polymer | | | |
|---|---|---|---|---|---|---|---|---|---|---|
| | Vinyl content in butadiene portion (%) | Bound styrene (%) | Presence or absence of vinyl content distribution breadth | Vinyl content in butadiene portion (%) | Bound styrene (%) | Presence or absence of vinyl content distribution breadth | Vinyl content in butadiene portion (%) | Bound styrene (%) | $ML_{1+4}^{100°C.}$ | (A)/(B) (wt. ratio) |
| Example 9 | 29 | 26 | " | 80 | 10 | Absent | 38 | 24 | 51 | 6/1 |
| Example 10 | 31 | 27 | Absent | 74 | 10 | Present | 61 | 16 | 54 | 1/2 |
| Comparative Example 1 | 15 | 10 | " | 65 | 30 | " | 37 | 20 | 48 | 1/1 |
| Comparative Example 2 | 62 | 25 | " | 76 | 11 | " | 69 | 18 | 47 | " |
| Comparative Example 3 | 30 | 5 | " | 80 | 15 | " | 54 | 10 | 55 | " |
| Comparative Example 4 | 31 | 58 | " | 80 | 10 | " | 67 | 34 | 53 | " |
| Comparative Example 5 | 32 | 26 | " | 55 | 10 | " | 45 | 18 | 51 | " |
| Comparative Example 6 | 31 | 20 | " | 72 | 38 | " | 48 | 29 | 47 | " |
| Comparative Example 7 | 15 | 15 | " | 80 | 20 | Absent | 47 | 18 | 51 | 1/1 |
| Comparative Example 8 | 60 | 18 | " | — | — | — | 60 | 18 | 48 | — |
| Comparative Example 9 | 80 | 10 | " | — | — | — | 80 | 10 | 49 | — |
| Comparative Example 10 | 31 | 26 | " | — | — | — | 31 | 26 | 50 | — |

TABLE 3

| | Parts by weight |
|---|---|
| Styrene-butadiene block copolymer | 100 |
| Carbon black (ISAF) | 50 |
| Aromatic process oil*3 | 10 |
| Zinc oxide | 4 |
| Stearic acid | 2 |
| Accelerator | |
| MSA*1 | 0.54 |
| DM*2 | 0.86 |
| Sulfur | 2.0 |

Note:
*1 N—oxydiethylene-2-benzothiazylsulfenamide (produced by Ouchi Shinko Kagaku Kogyo Co., Ltd., Japan)
*2 Dibenzothiazyl disulfide (produced by Ouchi Shinko Kagaku Kogyo Co., Ltd., Japan)
*3 High aromatic process oil (produced by Japan Synthetic Rubber Co., Ltd.)

TABLE 4

| | (1) 300% modulus (kg·f/cm²) | Tensile Strength (kg·f/cm²) | Elongation (%) | Hardness (JIS-A) | (2) Dunlop impact resilience at 70° C. (%) | (3) Heat-build up temperature ΔT(°C.) | (4) Wet skid (Index) | (5) Lambourn wear (Index) | (6) Roll retention of compounded rubber |
|---|---|---|---|---|---|---|---|---|---|
| Example 1 | 155 | 227 | 400 | 70 | 70 | 20 | 120 | 105 | Good |
| Example 2 | 153 | 230 | 410 | 69 | 71 | 19 | 110 | 110 | " |
| Example 3 | 161 | 231 | 390 | 71 | 69 | 20 | 125 | 105 | " |
| Example 4 | 162 | 235 | 420 | 71 | 68 | 20 | 125 | 100 | Excellent |
| Example 5 | 153 | 223 | 410 | 69 | 71 | 19 | 110 | 105 | Good |
| Example 6 | 155 | 228 | 410 | 69 | 69 | 20 | 120 | 105 | " |
| Example 7 | 160 | 235 | 420 | 70 | 70 | 19 | 115 | 110 | " |
| Example 8 | 155 | 220 | 400 | 71 | 70 | 20 | 105 | 105 | " |
| Example 9 | 158 | 240 | 430 | 69 | 71 | 19 | 105 | 120 | Excellent |
| Example 10 | 148 | 243 | 420 | 70 | 71 | 19 | 105 | 125 | Good |
| Example 11 | 165 | 216 | 390 | 72 | 68 | 21 | 130 | 105 | " |
| Comparative Example 1 | 163 | 217 | 420 | 68 | 68 | 20 | 95 | 105 | " |
| Comparative Example 2 | 168 | 205 | 370 | 73 | 65 | 23 | 150 | 90 | Fair |
| Comparative Example 3 | 140 | 200 | 380 | 70 | 72 | 19 | 90 | 105 | " |
| Comparative Example 4 | 165 | 240 | 390 | 72 | 63 | 25 | 150 | 100 | Excellent |
| Comparative Example 5 | 155 | 235 | 410 | 70 | 71 | 19 | 95 | 120 | Good |
| Comparative Example 6 | 160 | 225 | 400 | 72 | 64 | 24 | 140 | 95 | " |
| Comparative Example 7 | 158 | 210 | 400 | 69 | 67 | 22 | 105 | 100 | " |
| Comparative Example 8 | 160 | 212 | 400 | 69 | 68 | 21 | 100 | 100 | Fair |
| Comp Ex. 9/ Comp Ex. 10 | 150 | 205 | 400 | 70 | 67 | 21 | 105 | 95 | Fair–Bad |

TABLE 4-continued

|  | (1) 300% modulus (kg · f/cm²) | Tensile Strength (kg · f/cm²) | Elongation (%) | Hardness (JIS-A) | (2) Dunlop impact resilience at 70° C. (%) | (3) Heat-build up temperature ΔT(°C.) | (4) Wet skid (Index) | (5) Lambourn wear (Index) | (6) Roll retention of compounded rubber |
|---|---|---|---|---|---|---|---|---|---|
| blend (1/1) |  |  |  |  |  |  |  |  |  |

Note:
(1)Measured according to JIS-K-6301.
(2)Measured according to B.S-903 Part 22 method.
(3)Goodrich heat build-up, measured according to ASTM-D-623/58 (Method A).
(4)Measured on the indoor wet asphalt road surface by using a skid tester made by Stanley Inc., of Britain. The value obtained from Comparative Example 8 was expressed as 100 by way of a reference index. The greater the figure, the better.
(5)Measured by a Lambourn-wear tester at slip rate of 30% and at 25° C. The value obtained from Comparative Example 8 was expressed as 100 by way of a reference index. The greater the figure, the better.
(6)Roll retention of the compound mixed by an internal mixer was expressed by four-grade rating (Excellent, Good, Fair and Bad).

TABLE 5

|  | Block (A) polymerization conditions | | | | | Block (B') polymerization conditions | | | | |
|---|---|---|---|---|---|---|---|---|---|---|
|  | n-BuLi*¹ (g) | Butadiene/styrene (g) | Tetrahydrofuran (g) | Potassium dodecylbenzenesulfonate (g) | Polymerization temperature °C.) | Butadiene/styrene (g) | Tetrahydrofuran (g) | Polymerization temperature (°C.) | (A')/(B') (wt. ratio) | Remarks |
| Example 11 | 0.28 | 215/115 | 25 | — | 50-92 | 170/0 | 1.25 | 50 | 2/1 |  |
| Example 12 | 0.26 | " | " | — | 50-90 | " | 2.5 | " | " |  |
| Example 13 | 0.27 | " | 7.5 | — | 50 | " | 1.25 | " | " |  |
| Example 14 | 0.29 | " | 25 | — | 50-91 | 161/9 | " | " | " |  |
| Example 15 | 0.27 | " | " | — | 30-72 | 170/0 | " | " | " |  |
| Example 16 | 0.25 | 230/100 | " | — | 20-60 | " | " | " | " |  |
| Example 17 | 0.25 | 160/90 | 15 | — | 50-80 | 250/0 | " | " | 1/1 |  |
| Example 18 | 0.27 | 260/140 | 40 | — | 50-105 | 100/0 | " | " | 1/1 |  |
| Comparative Example 11 | 0.31 | 230/100 | — | 0.18 | 60 | 170/0 | 15 | 60 | 2/1 |  |
| Comparative Example 12 | 0.29 | " | Diglyme*² 1.95 | — | 50 | " | 1.25 | 50 | " |  |
| Comparative Example 13 | 0.28 | 130/200 | 25 | — | 50 | " | " | " | " |  |
| Comparative Example 14 | 0.26 | 215/115 | " | — | 50-90 | " | 25  30 | " | " |  |
| Comparative Example 15 | 0.27 | " | " | — | 50-91 | 136/34 | 1.25 | 50 | " |  |
| Comparative Example 16 | 0.27 | 380/120 | 7.5 | — | 50 | — | — | — | — | Uniform polymer |
| Comparative Example 17 | 0.26 | 325/175 | 10 | — | 50 | — | — | — | — | Uniform polymer |
| Comparative Example 18 | 0.25 | 500/0 | 2.5 | — | 70 | — | — | — | — | Uniform polymer |

Note:
Solvent: cyclohexane/n-hexane (90/10 by weight), 2,000 g
*¹: n-BuLi = normal butyllithium.
*²: Diglyme = diethylene glycol dimethyl ether.

TABLE 6

|  | Block (A') | | | Block (B') | | | Whole polymer | | | | |
|---|---|---|---|---|---|---|---|---|---|---|---|
|  | Vinyl content in butadiene portion (%) | Bound styrene (%) | Presence or absence of vinyl content distribution breadth | Vinyl content in butadiene portion (%) | Bound styrene (%) | Presence or absence of vinyl content distribution breadth | Vinyl content in butadiene portion (%) | Bound styrene (%) | $ML_{1+4}^{100°\ C.}$ | (A')/(B') (wt. ratio) | Remarks |
| Example |  |  |  |  |  |  |  |  |  |  |  |
| 11 | 49 | 35 | Present | 29 | 0 | Absent | 40 | 23 | 51 | 2/1 |  |
| 12 | 50 | 34 | " | 40 | 0 | " | 45 | 22 | 50 | " |  |
| 13 | 51 | 36 | Absent | 30 | 0 | " | 41 | 23 | 48 | " |  |
| 14 | 50 | 35 | Present | 29 | 5 | " | 41 | 23 | 47 | " |  |
| 15 | 58 | 35 | " | 31 | 0 | " | 46 | 23 | 52 | " |  |
| 16 | 65 | 30 | " | 28 | 0 | " | 50 | 20 | 53 | " |  |
| 17 | 44 | 35 | " | 29 | 0 | " | 35 | 18 | 51 | 1/1 |  |
| 18 | 50 | 35 | " | 30 | 0 | " | 44 | 28 | 53 | 4/1 |  |
| Comparative example |  |  |  |  |  |  |  |  |  |  |  |
| 11 | 15 | 30 | Absent | 60 | 0 | " | " | 34 | 20 | 50 | 2/1 |
| 12 | 80 | 30 | " | 30 | 0 | " | 59 | 20 | 48 | " |  |
| 13 | 50 | 60 | " | 30 | 0 | " | 39 | 40 | 47 | " |  |
| 14 | 50 | 35 | Present | 70 | 0 | " | 57 | 23 | 51 | " |  |
| 15 | 50 | 34 | " | 30 | 20 | " | 42 | 30 | 50 | " |  |
| 16 | 41 | 22 | Absent | — | — | " | 40 | 22 | 49 | — | Uniform |

TABLE 6-continued

| | Block (A') | | | Block (B') | | | Whole polymer | | | | |
|---|---|---|---|---|---|---|---|---|---|---|---|
| | Vinyl content in butadiene portion (%) | Bound styrene (%) | Presence or absence of vinyl content distribution breadth | Vinyl content in butadiene portion (%) | Bound styrene (%) | Presence or absence of vinyl content distribution breadth | Vinyl content in butadiene portion (%) | Bound styrene (%) | $ML_{1+4}^{100° C.}$ | (A')/(B') (wt. ratio) | Remarks |
| 17 | 51 | 35 | " | — | — | " | 51 | 35 | 51 | — | Uniform polymer |
| 18 | 30 | 0 | " | — | — | " | 30 | 0 | 48 | — | Uniform polymer |

TABLE 7

| | (1) 300% modulus (kg·f/cm²) | Tensile strength (kg·f/cm²) | Elongation (%) | Hardness (JIS-A) | (2) Dunlop impact resilience at 70° C. (%) | (3) Heat-build up temperature ΔT. (°C.) | (4) Wet skid (Index) | (5) Lambourn wear (Index) | (6) Roll retention of compounded rubber |
|---|---|---|---|---|---|---|---|---|---|
| Example | | | | | | | | | |
| 11 | 155 | 223 | 430 | 68 | 71 | 18.5 | 115 | 110 | Good |
| 12 | 157 | 220 | 400 | 68 | 69 | 19.0 | 115 | 115 | " |
| 13 | 150 | 216 | 420 | 67 | 70 | 19.0 | 110 | 105 | " |
| 14 | 147 | 227 | 410 | 69 | 70 | 19.5 | 120 | 120 | " |
| 15 | 148 | 219 | 410 | 69 | 69 | 19.5 | 125 | 110 | " |
| 16 | 152 | 220 | 420 | 68 | 69 | 19.5 | 120 | 110 | " |
| 17 | 149 | 223 | 420 | 69 | 72 | 18.0 | 110 | 110 | " |
| 18 | 155 | 231 | 430 | 69 | 67 | 20.5 | 125 | 125 | " |
| Comparative Example | | | | | | | | | |
| 11 | 147 | 217 | 400 | 69 | 68 | 20.5 | 105 | 105 | " |
| 12 | 161 | 195 | 370 | 72 | 64 | 23 | 130 | 90 | Fair |
| 13 | 149 | 210 | 380 | 72 | 62 | 25 | 140 | 95 | Good |
| 14 | 160 | 215 | 390 | 70 | 66 | 22 | 125 | 100 | " |
| 15 | 148 | 235 | 420 | 69 | 66 | 22 | 120 | 115 | " |
| 16 | 151 | 223 | 410 | 68 | 68 | 20 | 100 | 100 | Fair–Bad |
| Comp. Ex. 17/ Comp. Ex. 18 blend | 145 | 210 | 390 | 67 | 67 | 21 | 100 | 95 | Fair–Bad |

Note:
(1) Measured according to JIS-K-6301.
(2) Measured according to B.S-903 Part 22 method.
(3) Goodrich heat build-up, measured according to ASTM D-623/58 (Method A).
(4) Measured on the indoor wet asphalt road surface at 25° C. by using a skid tester made by Stanley Inc., of Britain. The value of Comparative Example 6 was Expressed as 100 by way of a reference index. The greater the figure, the better.
(5) Measured by Lambourn wear tester at a slip rate of 30% and at 25° C. The value of Comparative Example 6 was expressed as 100 by way of a reference index. The greater the figure, the better.
(6) Roll retention of the compound mixed by an internal mixer was expressed by four-grade rating (Excellent, Good, Fair, and Bad).

TABLE 8

| | Block (C) polymerization conditions | | | | Block (A") polymerization conditions | | |
|---|---|---|---|---|---|---|---|
| | n-BuLi*¹ (g) | Butadiene (g) | Tetrahydrofuran (g) | Polymerization temperature (°C.) | Butadiene styrene (g) | Tetrahydrofuran DBS-K*³ (g) | Polymerization temperature (°C.) |
| Example | | | | | | | |
| 19 | 0.33 | 125 | 1.5 | 40 | 188/62 | 2.5/0.1 | 40 |
| 20 | 0.31 | " | " | " | 162/88 | 3.0/0.1 | " |
| 21 | 0.30 | " | " | " | 175/75 | 5.0/0.1 | " |
| 22 | 0.32 | " | " | " | " | " | " |
| 23 | 0.29 | " | " | " | " | 5.0 | " |
| 24 | 0.31 | 167 | " | " | 117/50 | 6.0/0.1 | " |
| 25 | 0.30 | 83 | " | " | 234/100 | " | " |
| Comparative Example | | | | | | | |
| 19 | 0.34 | 0 | — | — | 212/38 | —/0.2 | " |
| 20 | 0.36 | 125 | 1.5 | 40 | 100/150 | 7.5/0.1 | " |
| 21 | 0.29 | " | 1.5 | 40 | 175/75 | 5.0/0.1 | " |
| 22 | 0.32 | " | 1.5 | " | 175/75 | 20/— | " |
| 23 | 0.31 | 415/85 | — | — | — | 7.5/0.1 | 40–50 |
| 24 | 0.28 | 500/0 | 1.5 | 40 | — | 1.5 | 40 |
| 25 | 0.32 | 350/150 | — | — | — | 5/0.1 | 40 |
| 26 | 0.31 | 450/50 | — | — | — | — | — |
| 27 | 0.31 | 250 | 1.5 | 40 | 187/63 | 2.5/0.1 | 40 |

| Block (B") polymerization conditions | |
|---|---|
| Butadiene/ | Polymerization |

TABLE 8-continued

|  | | styrene (g) | Diglyme*2 (g) | temperature (°C.) | (C)/(A")/(B") (wt. ratio) | Remarks |
|---|---|---|---|---|---|---|
| Example | | | | | | |
| | 19 | 113/12 | 1.4 | 40-60 | 1/3/1 | |
| | 20 | " | 1.3 | " | " | |
| | 21 | " | 1.3 | " | " | |
| | 22 | " | 3.3 | " | " | |
| | 23 | " | 1.2 | " | " | |
| | 24 | 150/17 | 1.3 | " | 1/1/1 | |
| | 25 | 75/8 | 1.3 | 50 | 1/4/1 | |
| Comparative Example | | | | | | |
| | 19 | 175/75 | 1.0 | 40-70 | 1/1((A")/(B")) | |
| | 20 | 119/6 | 1.2 | 40-60 | 1/2/1 | |
| | 21 | 81/44 | 3.0 | 40-60 | 1/2/1 | |
| | 22 | 113/12 | 1.3 | " | " | |
| | 23 | — | — | — | — | |
| | 24 | — | — | — | — | |
| | 25 | — | — | — | — | |
| | 26 | — | 0.7 | 50 | — | |
| | 27 | — | — | — | 1/1((C)/(A")) | |

Note:
Solvent: cyclohexane/n-hexane (90/10 by weight), 2,500 g.
*1n-BuLi = n-butyllithium.
*2Diglyme = diethylene glycol dimethyl ether.
*3Potassium dodecylbenzenesulfonate

TABLE 9

| | Block (C) | | Block (A") | | Block (B) | | Whole polymer | | | | |
|---|---|---|---|---|---|---|---|---|---|---|---|
| | Vinyl content in butadiene portion (%) | Bound styrene (%) | Vinyl content in butadiene portion (%) | Bound styrene (%) | Vinyl content in butadiene portion (%) | Bound styrene (%) | Vinyl content in butadiene portion (%) | Bound styrene (%) | $ML_{1+4}^{100°\,C.}$ | (C)/(A")/(B") (wt. ratio) | Remarks |
| Example | | | | | | | | | | | |
| 19 | 30 | 0 | 31 | 25 | 77 | 10 | 43 | 15 | 51 | 1/2/1 | |
| 20 | 31 | 0 | 30 | 36 | 78 | 11 | 44 | 20 | 50 | " | |
| 21 | 29 | 0 | 41 | 29 | 77 | 10 | 47 | 17 | 48 | " | |
| 22 | 30 | 0 | 40 | 30 | 85 | 10 | 49 | 18 | 52 | " | |
| 23 | 31 | 0 | 40 | 31 | 78 | 11 | 47 | 18 | 50 | " | |
| 24 | 30 | 0 | 40 | 30 | 79 | 10 | 49 | 13 | 51 | 1/1/1 | |
| 25 | 29 | 0 | 39 | 31 | 77 | 11 | 44 | 22 | 52 | 1/4/1 | |
| Comparative Example | | | | | | | | | | | |
| 19 | — | — | 13 | 15 | 65 | 27 | 36 | 21 | 55 | 1/1((A")/(B")) | |
| 20 | 30 | 0 | 40 | 60 | 77 | 5 | 49 | 31 | 51 | 1/2/1 | |
| 21 | 32 | 0 | 40 | 31 | 78 | 35 | 45 | 24 | 49 | 1/2/1 | |
| 22 | 29 | 0 | 60 | 30 | 77 | 10 | 55 | 17 | 50 | " | |
| 23 | 47 | 17 | — | — | — | — | 47 | 17 | 58 | — | Random SBR |
| 24 | 31 | 0 | — | — | — | — | 31 | 0 | 49 | — | " |
| 25 | 40 | 31 | — | — | — | — | 40 | 31 | 52 | — | " |
| 26 | 78 | 10 | — | — | — | — | 78 | 10 | 51 | — | " |
| 27 | 30 | 0 | 31 | 25 | — | — | 30 | 17 | 50 | 1/2((C)/(A")) | |

TABLE 10

| | (1) 300% modulus (kg·f/cm²) | Tensile strength (kg·f/cm²) | Elongation (%) | Hardness (JIS-A) | (2) Dunlop impact resilience at 70° C. (%) | (3) Heat-build up temperature ΔT (°C.) | (4) Wet skid (Index) | (5) Lambourn wear (Index) | (6) Roll retention of compounded rubber |
|---|---|---|---|---|---|---|---|---|---|
| Example | | | | | | | | | |
| 15 | 151 | 230 | 410 | 67 | 73 | 18 | 105 | 110 | Good |
| 20 | 155 | 233 | 420 | 68 | 71 | 20 | 115 | 110 | Excellent |
| 21 | 157 | 235 | 420 | 68 | 72 | 19 | 110 | 115 | " |
| 22 | 158 | 229 | 400 | 69 | 71 | 20 | 115 | 110 | " |
| 23 | 156 | 237 | 420 | 68 | 72 | 19 | 110 | 110 | " |
| 24 | 148 | 225 | 420 | 69 | 73 | 18 | 105 | 110 | Good |
| 25 | 153 | 240 | 410 | 67 | 71 | 20 | 110 | 120 | Excellent |
| Comparative Example | | | | | | | | | |
| 19 | 160 | 215 | 420 | 68 | 68 | 20.5 | 95 | 105 | Good |
| 20 | 163 | 230 | 380 | 71 | 62 | 25 | 140 | 95 | " |
| 21 | 160 | 220 | 390 | 71 | 63 | 24 | 140 | 95 | " |
| 22 | 165 | 225 | 390 | 70 | 65 | 23 | 130 | 95 | " |
| 23 | 145 | 215 | 410 | 67 | 68 | 20.5 | 100 | 100 | Fair-Bad |
| Blend (7) 1 | 141 | 205 | 400 | 67 | 66 | 21.5 | 100 | 95 | Bad |

TABLE 10-continued

|  | (1) 300% modulus (kg·f/cm²) | Tensile strength (kg·f/cm²) | Elongation (%) | Hardness (JIS-A) | (2) Dunlop impact resilience at 70° C. (%) | (3) Heat-build up temperature ΔT (°C.) | (4) Wet skid (Index) | (5) Lambourn wear (Index) | (6) Roll retention of compounded rubber |
|---|---|---|---|---|---|---|---|---|---|
| Blend (8) 2 | 156 | 205 | 410 | 68 | 69 | 20 | 90 | 100 | Fair–Bad |
| Blend (9) 3 | 153 | 207 | 400 | 69 | 68 | 21 | 95 | 100 | " |

Note:
(1) Measured according to JIS-K-6301.
(2) Measured according to B.S-903 Part 22 method.
(3) Goodrich heat build-up measured according to ASTM D-623/58 (Method A).
(4) Measured on the indoor wet asphalt road surface at 25°C. by using a skid tester made by Stanley Inc., of Britain. The value of Comparative Example 24 was expressed as 100 by way of a reference index. The greater the figure, the better.
(5) Measured by Lambourn wear tester at a slip rate of 30% and at 25° C. The value of Comparative Example 7 was expressed as 100 by way of a reference index. The greater the figure, the better.
(6) Roll retention of the compound mixed by an internal mixer was expressed by four-grade rating (Excellent, Good, Fair and Bad).
(7) Comp. Ex. 24, Comp. Ex. 25 and Comp. Ex. 26 were blended at a ratio of 1/2/1.
(8) Comp. Ex. 19 and Comp. Ex. 24 were blended at a ratio of 2/1.
(9) Comp. Ex. 26 and Comp. Ex. 27 were blended at a ratio of 1/2.

What is claimed is:

1. A styrene-butadiene block copolymer having a Mooney viscosity ($ML_{1+4}$, 100° C.) of 10 to 150, a total vinyl content in the whole bound butadiene of 30 to 70% and a total bound styrene content of 10 to 40% by weight, which comprises a combination of (A) at least one styrene-butadiene random copolymer block having a bound styrene content of 10 to 50% by weight and a vinyl content of 25 to 50% in the butadiene portion, and (B) at least one styrene-butadiene random copolymer block having a bound styrene content of 1 to 30% by weight and a vinyl content of at least 60% in the butadiene portion, the fraction of the block (A) being 10 to 90% by weight, a combination of (A') at least one styrene-butadiene random copolymer block having a bound styrene content of 20 to 50% by weight and a vinyl content of 40 to 75% in the butadiene portion, and (B') at least one polymer block having a bound styrene content of not more than 10% by weight and a vinyl content of more than 20% but not more than 50% in the butadiene portion, the fraction of the block (A') being 10 to 90% by weight, or a combination of (A'') at least one styrene-butadiene random copolymer block having a bound styrene content of 10 to 50% by weight and a vinyl content of 10 to 50% in the butadiene portion, (B'') at least one styrene-butadiene random copolymer block having a bound styrene content of 1 to 30% by weight and a vinyl content of at least 60% in the butadiene portion, and (C) at least one polybutadiene block having a vinyl content of 10 to 50%, each of the blocks (A''), (B'') and (C) being contained in a proportion of at least 10% by weight.

2. A styrene-butadiene block copolymer according to claim 1, wherein the copolymer comprises a combination of the (A) blocks and the (B) blocks.

3. A styrene-butadiene block copolymer according to claim 2, wherein the vinyl contents in the (A) and (B) blocks are 25 to 45% and at least 70%, respectively, and the bound styrene contents in the (A) and (B) blocks are 15 to 40% by weight and 5 to 20% by weight, respectively.

4. A styrene-butadiene block copolymer according to claim 1, wherein the copolymer comprises a combination of the (A') blocks and the (B') blocks.

5. A styrene-butadiene block copolymer according to claim 4, wherein the vinyl contents in the (A') and (B') blocks are 40 to 70% and 25 to 50%, respectively, and the bound styrene contents in the (A') and (B') blocks are 20 to 40% and not more than 10% by weight.

6. A styrene-butadiene block copolymer according to claim 1, wherein the copolymer comprises a combination of the (A'') blocks, the (B'') blocks and the (C) blocks.

7. A styrene-butadiene block copolymer according to claim 6, wherein the vinyl contents in the (A''), (B'') and (C) blocks are 20 to 40%, at least 70% and 20 to 40%, respectively, and the bound styrene contents in the (A'') and (B'') blocks are 20 to 50% by weight and 5 to 20% by weight, respectively.

8. A styrene-butadiene block copolymer according to any one of claims 1 to 7, wherein at least one of the blocks has a vinyl content distribution breadth of at least 20%.

* * * * *